United States Patent
Wollbrinck et al.

(10) Patent No.: US 8,794,059 B2
(45) Date of Patent: Aug. 5, 2014

(54) TIRE TESTING APPARATUS HAVING ADJUSTABLE BEAD WIDTH

(75) Inventors: James Wollbrinck, Carrollton, OH (US); Richard R. Matuszny, Strongsville, OH (US); Barry Cargould, Hudson, OH (US); Richard Krieger, Manistee, MI (US)

(73) Assignee: Micro-Poise Measurement Systems, LLC, Streetsboro, OH (US)

( * ) Notice: Subject to any disclaimer, the term of this patent is extended or adjusted under 35 U.S.C. 154(b) by 143 days.

(21) Appl. No.: 13/583,284

(22) PCT Filed: Mar. 10, 2011

(86) PCT No.: PCT/US2011/027899
§ 371 (c)(1),
(2), (4) Date: Sep. 7, 2012

(87) PCT Pub. No.: WO2011/112811
PCT Pub. Date: Sep. 15, 2011

(65) Prior Publication Data
US 2013/0036810 A1    Feb. 14, 2013

Related U.S. Application Data

(60) Provisional application No. 61/312,432, filed on Mar. 10, 2010.

(51) Int. Cl.
*G01M 17/02* (2006.01)
(52) U.S. Cl.
USPC .......................................................... 73/146
(58) Field of Classification Search
USPC ............................................ 73/146–146.8
See application file for complete search history.

(56) References Cited

U.S. PATENT DOCUMENTS

| 4,618,303 | A |   | 10/1986 | Irie |
| 4,846,334 | A |   | 7/1989  | Cargould |
| 4,852,398 | A |   | 8/1989  | Cargould et al. |
| 5,029,467 | A | * | 7/1991  | Cargould ...................... 73/146 |
| 5,448,910 | A |   | 9/1995  | Yurjevich et al. |
| 5,719,331 | A | * | 2/1998  | Delmoro ...................... 73/146 |
| 2001/0015098 | A1 | * | 8/2001 | Anno et al. ................. 73/146 |
| 2003/0167833 | A1 | * | 9/2003 | Corghi ........................ 73/146 |
| 2007/0220964 | A1 | * | 9/2007 | Shinomoto et al. ......... 73/146 |
| 2011/0203362 | A1 | * | 8/2011 | Imamura et al. ............ 73/146 |
| 2013/0042980 | A1 | * | 2/2013 | Sotgiu ..................... 157/1.24 |

OTHER PUBLICATIONS

International Search Report PCT/US2011/027899 and Written Opinion dated May 4, 2011.

* cited by examiner

*Primary Examiner* — Andre Allen
(74) *Attorney, Agent, or Firm* — Tarolli, Sundheim, Covell & Tummino LLP

(57) ABSTRACT

An adjustable width chuck assembly for a tire testing machine including upper and lower relatively movable rims by which a tire is clamped and held during a testing cycle. A pilot or nose cone forming part of one of the rims is gas pressure biased towards engagement with complementally formed structure on the other rim. The gas pressure bias is provided by a gas spring which can be replaced with gas springs of differing pressures in order to adjust the biasing force or, alternately, the gas spring can be removed from the chuck assembly and re-pressurized to a different level in order to change its biasing force. The use of a gas spring for providing the necessary biasing force expands the range of motion for the nose cone, thus allowing a given chuck assembly to accommodate tires having a wide range of bead widths.

15 Claims, 3 Drawing Sheets

TIRE TESTING APPARATUS HAVING ADJUSTABLE BEAD WIDTH

RELATED APPLICATIONS

This application claims priority from U.S. Provisional Application No. 61/312,432, filed Mar. 10, 2010, the entirety of which is incorporated herein by reference.

FIELD OF THE INVENTION

This invention relates to tire testing. More particularly, the invention relates to an apparatus and method for chucking tires of differing bead widths in a test machine such as a tire uniformity-testing machine.

BACKGROUND ART

While the present invention may find application in a wide variety of tire testing apparatus wherein it is necessary to rapidly chuck tires it is applicable to great advantage in tire uniformity testing machines. Tire uniformity testing machines commonly include an upper rim, a vertically-movable lower rim, and a conveyor to bring a tire between the upper and lower rims. A mechanism is provided to raise the lower rim through an opening in the conveyor, carrying a tire with it, to the upper rim where the tire is inflated. The lower rim carries a center cone that is engagable with a center recess in the upper rim, the cone precisely positioning the upper rim with respect to the lower rim so that the two rims are concentric when a tire is clamped between them. A motor is connected to the upper rim to rotate it at a predetermined test speed. A load wheel or road wheel, rotatable on an axis parallel to the axis of the tire, is movable into engagement with the tire tread so as to load the tire as it rotates in a manner simulating a road condition.

A hydraulic actuator is connected to the lower rim to raise and lower it. This actuator must be capable of applying a force sufficient to overcome the separation force of tens of thousands of pounds acting on the rims when the tire is inflated. The force applied by the actuator must also be sufficiently great to hold the cone against the recess of the upper rim with sufficient pressure to driveably couple the upper and lower rims so that the rotational force applied to the upper rim is transmitted to the lower rim through the center cone rather than through the tire substantially without slip which might otherwise distort the tire and possibly affect test results.

A prior art apparatus and mechanism is described in U.S. Pat. No. 4,852,398.

DISCLOSURE OF INVENTION

The present invention provides a new and improved tire testing apparatus. In particular, the present invention provides a new and improved chuck assembly, which improves upon the chuck assembly disclosed in U.S. Pat. No. 4,852,398 which is hereby incorporated by reference.

According to a preferred embodiment, the chuck assembly is capable of chucking tires of various bead widths and the variation of bead widths may be substantial. The chuck includes first and second rims, each rim engageable with a bead of a tire. An actuator is connected to at least one of the rims and is operated to move the rim towards and away from the other rim. The actuator moves the associated rim towards the other rim in order to engage a tire between the rims. After the completion of a test cycle, the rims separate in order to release the tested tire. According to the invention, at least one of the rims forms part of an assembly that includes a telescoping pilot element or nose cone that is biased towards the other rim by gas pressure. In the preferred and illustrated embodiment, the nose cone is biased by a gas spring, which urges the nose cone towards engagement with a receiving structure i.e., recess, forming part of the other rim assembly.

In the illustrated embodiment of the invention, when the rims are brought together into a tire holding position, the nose cone tightly engages an associated recess of the other rim. The force of the now compressed gas spring rotatably couples the rims together so that rotating one rim produces attendant rotation in the other rim.

According to a feature of the invention, the gas spring is removably mounted within a shank of the nose cone. If a different biasing force for the nose cone is desired, the gas spring may be removed and replaced with one of different pressurization, or alternately, the gas spring may be pressurized to a different level and then reinstalled into the shank of the nose cone.

With the disclosed invention, the biasing force exerted by the nose cone (or pilot) can be easily adjusted. Moreover, the construction and operation of the chuck apparatus is simplified. The elimination of a mechanical spring, as used in the prior art, allows the limits of travel of the nose cone to be substantially extended, thus allowing the chuck assembly to accommodate a wider range of tire bead widths.

Additional features of the invention will become apparent and a fuller understanding obtained by reading the following detailed description made with the accompanying drawings.

DETAILED DESCRIPTION OF THE INVENTION

Figure 1:
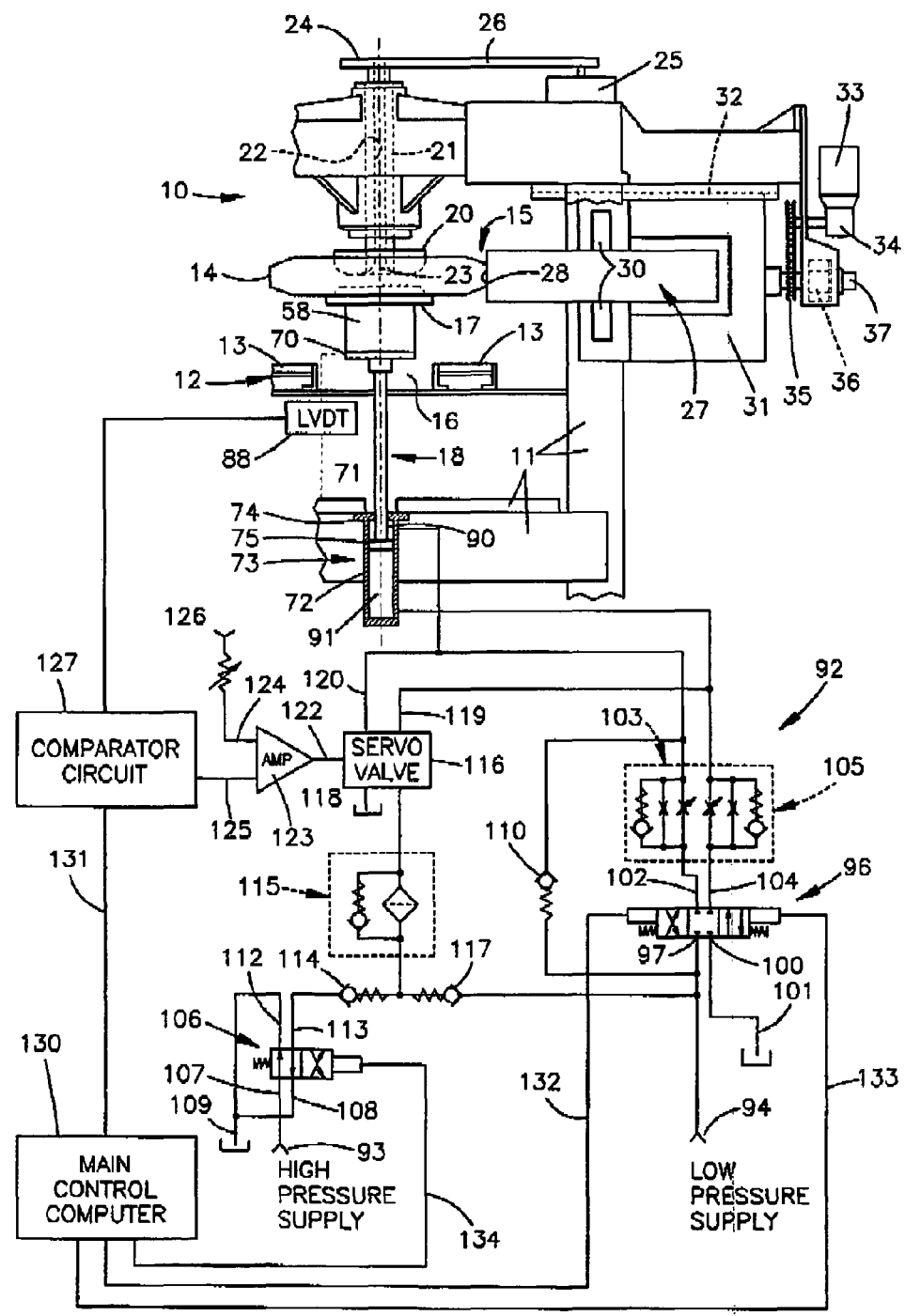
FIG. 1 is a diagrammatic side elevational view of a tire testing machine incorporating a preferred embodiment of the present invention and FIGS. 2A and 2B illustrate the construction of an automatic adjustable width chuck constructed in accordance with a preferred embodiment of the invention.

FIG. 1 illustrates a tire uniformity inspection machine 10 that incorporates a tire chucking/clamping apparatus constructed in accordance with the invention. The machine 10 also includes a frame 11, which supports a conveyor 12 having a plurality of rollers 13 for delivering a tire 14 to be inspected to a test station 15. Conveyor 12, is described in detail in commonly, assigned U.S. Pat. No. 4,846,334, expressly incorporated by reference herein in its entirety. Conveyor 12 includes an opening 16, which is small enough to prevent a tire from falling through, but large enough to pass a lower rim 17, which is rotatably mounted upon a vertically retractable, lower rim assembly 18. An upper rim 20 is rotatably mounted by means of an upper rim spindle 21 to the upper portion of frame 11. Upper rim 20 is disposed opposite lower rim 17 so that upper and lower rims 20 and 17 cooperate to function as a rim to support a tire 14 under test when lower rim 17 is in its extended position as shown in FIG. 1 and in phantom view in FIG. 2. Upper rim spindle 21 includes an axial air passage 22 which communicates with an orifice 23 in upper rim 20 to permit inflation of tire 14. The rims and associated components described above form part of an adjustable width tire chuck assembly constructed in accordance with the invention.

In order to rotate a tire under test, upper rim spindle 21 is fitted with a drive pulley 24 connected to a drive motor 25 by way of a timing belt 26.

A loadwheel 27 having a circumferential surface 28 is supported by loadwheel spindles 30 for free rotation about an axis parallel to that of the tire 14 under test. Loadwheel spindles 30 are in turn supported by a carriage 31 which is slidably secured to frame 11 by one or more ways 32 so as to be movable in the radial direction, toward and away from tire 14. As carriage 31 urges loadwheel 27 radially inward (to the left in FIG. 1) against tire 14, the radial load on tire 14 increases. Likewise, movement of carriage 31 radially outward (to the right in FIG. 1) reduces the radial force on tire 14. Carriage 31 is moved back and forth by a reversible D.C. motor 33 secured to frame 11. Motor 33 drives a gear box 34 whose output drives a chain and sprocket linkage 35 to rotate a ball screw rotation only female screw 36. A screw shaft 37 fixed to carriage 31 is received within female screw 36 in order to translate carriage 31 in the radial direction as female screw 36 rotates.

Figure 2A:
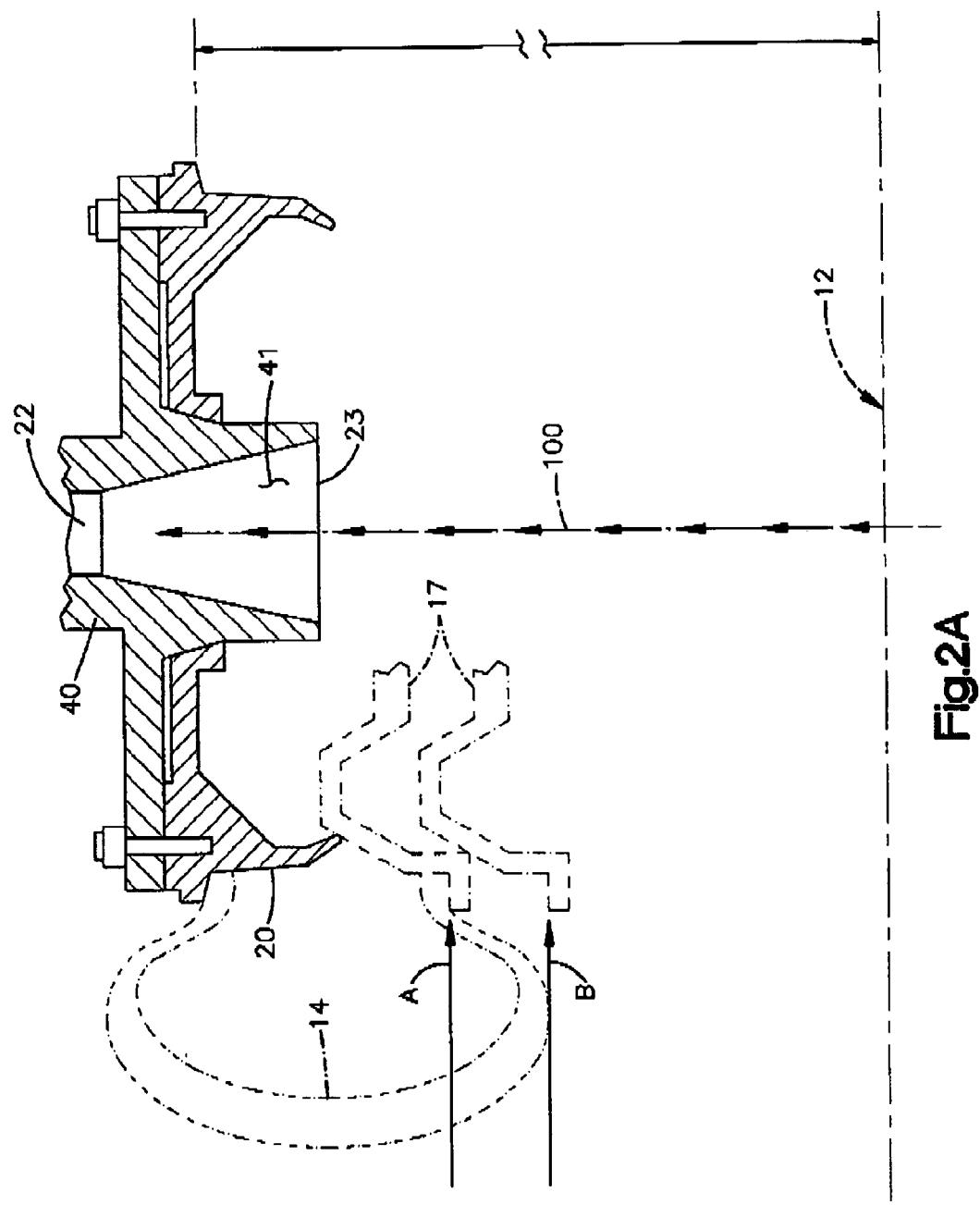
Figure 2B:
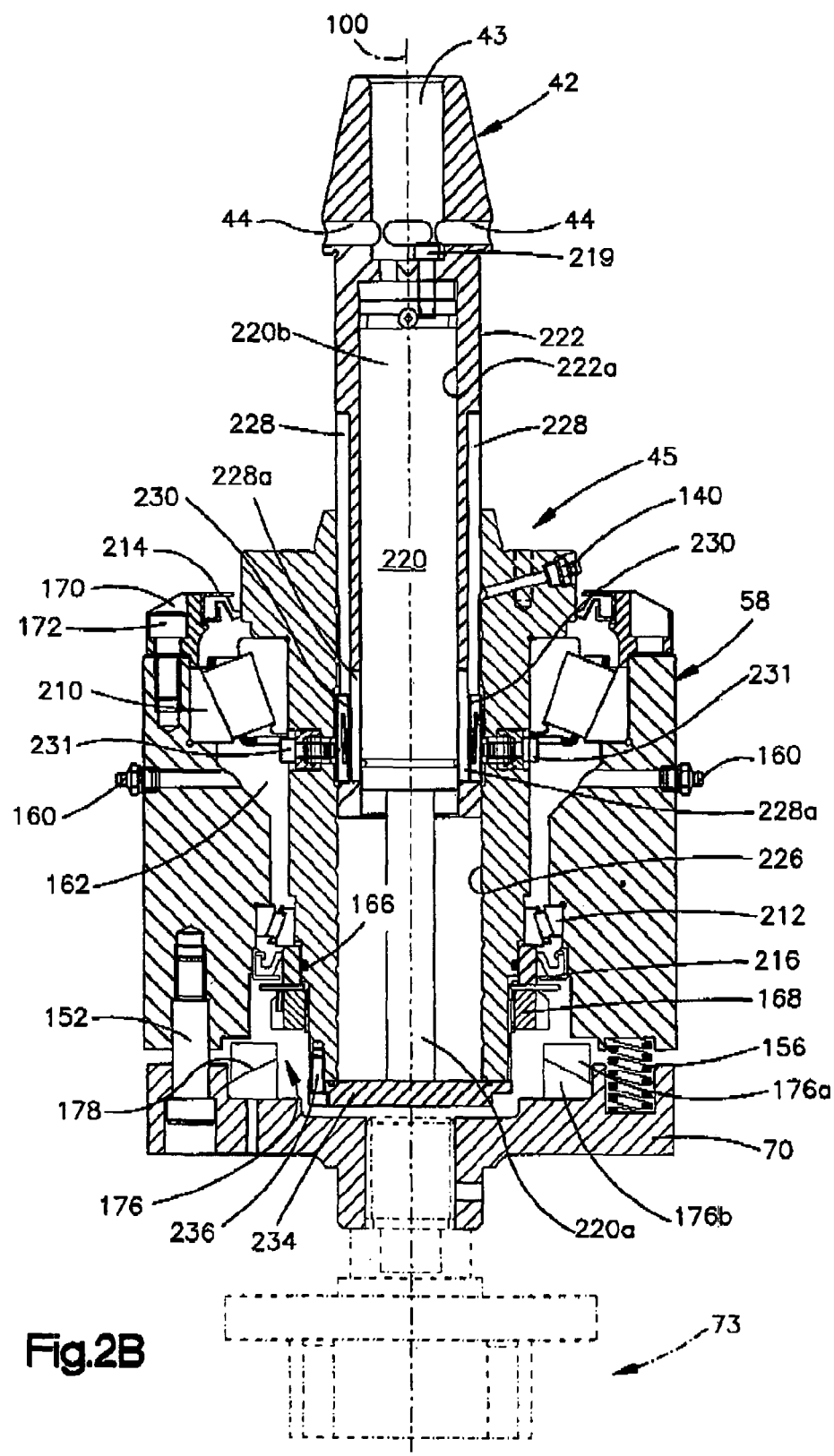

Referring to FIGS. 2A and 2B, the upper rim 20 is mounted on an adaptor 40 that is secured to the drive pulley 24 (FIG. 1). The air passage or central bore 22 provides a conical recess or seat 41 to receive a slidable pilot or nose cone 42 (FIG. 2B) on the lower half rim or chuck 17. Cone 42 includes an axial bore 43, which mates with air passage bore 22 when nose cone 42 engages seat 41 to provide a path for tire inflation air, which is supplied to the interior of tire 14 by way of radial ports 44 which intersect, bore 43. The cone 42 is vertically slidable in a lower spindle 45 along a path indicated by the line 100.

The spindle 45 is rotatably supported by a spindle housing 58. In particular, the spindle 45 is supported by upper and lower bearings 210, 212. Associated bearing seals 214, 216 seal the interface between the housing 58 and the spindle 45 in the vicinity of the bearings 210, 212, respectively. According to the invention, the nose cone 42 is reciprocally movable towards and away from the conical seat 41 formed in the adaptor 40 (see FIG. 2A) by a gas spring 220 (shown in elevation in FIG. 2B). The air spring 220 biases the nose cone 42 towards its extended position shown in FIG. 2B and is attached to the nose cone by one or more bolts 219.

As seen best in FIG. 2B, the nose cone 42 is mounted to or forms an integral part of a hollow shank 222 that is slidable within a bore 226 defined by the spindle 45. At least one, but preferably two longitudinal slots 228 are formed in shank 222 to form keyways. Internally threaded keys 230 are secured within keyways 228 by associated bolts/screws 231 counterbored within lower spindle 45. Keys 230 and keyways 228 permit cone 42 to slide or reciprocate axially with respect to spindle 45 but preclude rotation of cone 42 with respect to spindle 45. Thus, the rotary force imparted to the upper rim 20 is transmitted to cone 42 and through the keys 230 and keyways 228 to the spindle 45. Keys 230 further serve to limit the axial travel of shank 222 to retain it within spindle 45. The extremes of motion for the shank 222 are determined by the extent of the longitudinal slots 228.

In the preferred embodiment, O-rings (not shown) are used to seal the screws 231 to their respective bores. The O-rings inhibit air leakage from an inflated tire held between the upper and lower rim 20, 17. In the preferred and illustrated embodiment, the slots 228 are not through slots for most of their lengths. In other words, the slots 228 do not extend through the body of the shank 222. However, in the preferred and illustrated embodiment, the lower ends of the slots 228 (as viewed in FIG. 2B), include through portions 228a, which enable the installation of the keys 230. To assemble the chuck assembly, the shank 222 is suitably positioned within the bore 226 such that the through slots 228a are aligned with the mounting positions for the keys 230. While held in position, the set screws 231, with associated seals, are threaded into the keys in order to lock them to the wall of the housing 45. The gas spring 220 would then be installed into the cylindrical recess 222a defined by the shank 222.

A piston rod 220a extends from the cylinder 220b and acts between the cylinder and a removable plate 234 secured to the bottom of the spindle 45 by suitable bolts 236. As is known, an inside region of the gas spring is pressurized with a suitable gas such as nitrogen. The pressure acting on the upper and lower sides of an internal piston produce a net force acting on the piston tending to extend the piston rod 220a. Since the piston rod 220a is fixed, the cylinder 220b moves or is urged upwardly (as viewed in FIG. 2B) due to the forces exerted on the piston by the pressurized gas within the gas spring. A gas spring suitable for this application is available from Kaller Gas Springs of Frazer Mich. It has been found that for a chuck assembly constructed in accordance with the preferred embodiment of the invention, a Kaller gas spring Part No. TU 750-160 will provide a 5" range of motion for the nose cone 42 (as compared to a range of motion of 2.5" for a prior art chuck assembly that utilizes a mechanical spring. A 5" range of motion for the nose cone enables the chuck assembly to accommodate a wide variation in tire bead widths.

As seen in FIG. 2B, a lubricating fitting 140 is provided to lubricate the outside of the shank wall to facilitate axial movement of the nose cone shank 222 within the spindle bore 226.

The spindle housing 58 is suitably mounted to an adaptor plate 70 by a plurality of fasteners 152 which are threadedly received in the housing 58 and are spaced 120° apart. A plurality of springs 156 provide a resilient mounting between the adaptor plate 150 and the spindle housing 58 to allow slight relative movement between the adaptor plate 70 and the housing which can compensate for slight misalignments between the nose cone 42 and the conical seat 41 (shown in FIG. 2A). A plurality of lubricating fittings 160 are provided by which lubricant is injected into the region 162 between the rotatable spindle 45 and an internal recess in the housing 58 which receives the spindle. O-rings such as O-ring 166 are used in various locations to seal interfaces between components. A nut 168 acts as a bearing retainer for the lower bearing 116. An upper cap 170 is secured by bolts 172 to the main housing 58 and serves to retain the bearing 110 in position.

The base plate or adapter 70 is suitably coupled to the hydraulic actuator 73 (see FIG. 1) which includes a piston 75 and which reciprocates within a cylinder 72. The operation of the actuator 73 raises and lowers the spindle housing (and associated spindle) along the path 100 in order to engage a tire between the upper rim 20 and the lower rim 17.

Matched sets of concave and convex washers or spacers 176a, 176b are also provided between the base plate 70 and the housing 58. The washers/spacers 176a, 176b serve as a spherical bearing 176 which facilitates the alignment of the nose cone 42 with its associated recess 41 located in the upper rim assembly. During clamping of the tire between the upper and lower rims, the actuator 73 moves the lower spindle housing towards the upper rim in order to engage the nose cone 42 with its recess 43. After the nose cone 42 enters the recess, the actuator 73 continues to raise the lower spindle, thus causing compression of the gas spring 120. The force exerted by this gas spring on the spindle housing 58 causes the springs 156 to compress until the spindle housing 58 contacts the spherical bearing 176 tightly capturing it between the housing 58 and the base plate 70. The spherical bearing 176 allows slight movement in the spindle housing 58 during this clamping phase to ensure tight and full engagement between the nose cone 42 and the recess 41.

In a preferred method of operating the machine, the spindle housing 58 is driven upwardly to a "0" position at which the upper and lower rims are spaced apart less than the actual bead width of the tire held between the rims. The spindle housing 58 is then lowered by the actuator 71 to the proper bead width for the tire being tested. Further details of the operation of the overall machine with a prior art spindle assembly can be found in U.S. Pat. No. 4,852,398, which is hereby incorporated by reference.

Referring to FIG. 1, an LVDT 88 is mechanically connected between the base plate/adaptor 70 and the frame 11. Its function is to produce an electrical signal that is the measure of the vertical distance between the lower rim 17 and the upper rim 20. As previously noted, hydraulic actuator 73 (FIG. 1) includes a piston 75, which reciprocates within a cylinder 72. The top side 90 of piston 75 and the bottom side 91 of piston 75 are connected to a hydraulic servo-control system 92 which will now be described in further detail.

Control system 92 includes a high pressure fluid supply 93 and a low pressure, high volume fluid supply 94. High pressure supply 93 is at a nominal pressure of 2000 psi, while low pressure supply 94 is at a nominal pressure of 1000 psi and is capable of supplying fluid at a rate of about 25 gpm. A valve 96 has a first input port 97 connected to low pressure high volume supply 94 and a second input port 100 connected to a hydraulic return 101. Valve 96 is a double acting 4 way, 3 position solenoid valve with spring return to center. Valve 96 further includes a first output port 102 connected by way of a flow control 103 to the top side 90 of piston 75. Valve 96 has a second output port 104 connected by way of a flow control 105 to the bottom side 91 of piston 75. A line incorporating a check valve 110 shunts the input 97 of valve 96 and the output of flow control 103 to provide regenerative action when piston 75 is raised.

High pressure supply 93 is connected to a 3 way, 2 position single acting solenoid valve 106 at a first input port 107 thereof. A second input port 108 of valve 106 is connected to a return 109. Valve 106 has a first output port 112, which is also connected to return 109 and a second output 113 which is connected by way of a check valve 114 and a 3 micron filter 115 to the pressure input of servo-valve 116 which is preferably a Part No. BD-15-25-N manufactured by Parker Hannifin. The input to filter 115 is further connected to low pressure supply 94 through a check valve 117 which prevents high pressure fluid from flowing into the low pressure system. Servo-valve 116 includes a return connection 118, a first output 119 connected to the bottom side 91 of actuator 73 and a second output 120 connected to the top side 90 of actuator 73. Servo-valve 116 is connected electrically by way of a control line 122 to a conventional servo-amplifier 123 having a set point input 124 and a control input 125 the latter of which receives a distance indication signal from a comparator board 127. The comparator board 127 takes a distance indication signal from the LVDT 88 and compares it to the signal corresponding from the main control computer 130. It calculates a bead set location, which is input to the servo amplifier 123. Set point input 124 is shown connected to a set point control potentiometer 126 whereby a desired bead width set point may be determined. Alternatively, a set point input 124 could receive approximate set point control signals from which signal may be varied according to the bead widths of individual tires being tested. The main control computer 130 of machine 10 includes, inter alia an input 131 from the comparator board/circuit 127 from which it receives distance information as well as appropriate outputs 132 and 133 for actuating valve 96 to the right and left respectively and an output 134 for actuating valve 106.

In operation, piston 75 and rod 71 are initially in a fully retracted or home position. When a tire 14 to be tested is in position for mounting, the main control computer 130 actuates valve 96 by way of output 132 to shift its spool to the right in the FIG. 1 to connect low pressure, high volume supply 94 to the underside 91 of piston 75 through flow control 105. This results in rapid upward movement of piston 75, the velocity of which is controlled by the setting of flow controls 103.

As lower rim 17 passes upward through the opening in conveyor 12, rim 17 engages the lower bead of tire 14 carrying tire 14 upward with it. The lower rim assembly 18 rises until nose cone 42 engages tapered seat 41 to center and insure parallelism of rims 17 and 20. This alignment is further assisted by spherical washers 176a, 176b which can pivot slightly about their mated spherical surfaces at 178 as well as shift laterally slightly if required in the seat in housing 58. At this point the lower rim 17 is indicated at A in FIG. 2A. It should be noted here that in FIG. 2A, the lower rim 17, in position A, is shown in contact with the upper rim 20. This is usually termed the "bead set" position. For tires having a large bead width, the "bead set" position may be a position at which the rim 20 and rim 17 are spaced apart but not touching. In any event, during clamping of the tire, the upper and lower rims 20, 17 are brought to a "bead set" position at which the rims are spaced apart less than the bead width of the tire so that seating, inflation and clamping of the tire is facilitated. The rims 20, 17 are then moved apart to the appropriate bead width for the tire at which point the tire is then tested, balanced and/or inspected depending on the type of equipment the rims are used on.

In this location, the spacing between rims 17 and 20 as sensed by LVDT 88 (and processed by the comparator circuit 127) and indicated by the signal appearing at input 125 of amplifier 123 is narrower than the desired bead width as indicated by the set point signal applied at input 124 of servo amp 123 as determined by the setting of potentiometer 126. Accordingly, a large position error signal is generated by amp 123 on line 122. Servovalve 116 then assumes control and, in response to the error signal on line 122, supplies fluid from port 120 to the top side 90 of piston 75 and receives fluid into port 119 from the underside 91 of piston 75 to begin to move lower rim 17 downward. About the same time, while lower rim 17 is still at or near position A, the main unit controller 120 initiates inflation of tire 14 by flowing air through passage 22 and outward from ports 44 into the area between rims 17 and 20. Because the upper bead of tire 14 is seating on or at least a reduced distance from upper rim 20, pressurization of tire 14 while lower rim 17 is so located provides more reliable seating of the upper bead of tire 14 upon rim 20.

Lower rim 17 continues to move downward as tire 14 is inflated. As rim 17 approaches the desired bead width set by potentiometer 126, as indicated by position B in FIG. 2A, controller 130 energizes valve 106 by way of line 134 to connect high pressure supply 93 to the pressure input of servovalve 116 through filter 115 and deenergizes valve 96 which reassumes its center, blocked position. Lower rim 17 reaches position B which corresponds to a desired bead width appropriate for tire 14 and is maintained there under the continuous closed loop control of system 92 while tire testing proceeds.

As is well known in the art, testing includes driving carriage 31 radially inward until the surface 28 of loadwheel 27 engages the tread surface of tire 14 which is rotatably driven by motive force supplied by motor 25 through belt 26 to upper rim spindle 21 and through adapter 40 to upper rim 20. Due to the force applied by spring 53, tapered seat 41 is securely frictionally coupled to nose cone 42 to drive lower rim 17 with upper rim 20 without significant rotational slip between the two rims. During testing, forces transmitted by the rotating tire 14 to loadwheel are picked up by sensors (not shown) and analyzed by computing means (also not shown) to characterize the uniformity of construction of tire 14.

At the conclusion of testing, tire 14 is deflated and high pressure is removed from actuator 73 and controller 130 deactivates valve 106 allowing its spring to return its spool to its normal, recirculating position. Valve 96 is then energized via line 133 to move its spool to the left as shown in FIG. 1, thereby connecting the top side 90 of piston 75 to low pressure high volume supply 94 through flow control 103 and connecting the bottom side 91 of piston 75 to return 101 through flow control 105. This effects a rapid downward movement of piston 75 to its initial or home position at a velocity which be adjusted by way of flow controls 103 and 105.

With the disclosed invention, the spring rate for the nose cone assembly can be easily modified by either replacing the installed gas spring with a gas spring having a different gas pressure, or, alternatively, by removing the gas spring 220 and changing its pressurization with an apparatus designed to add or remove pressurized gas from the cylinder 220b of the gas spring. This apparatus for adding or removing pressurized gas from the gas spring 220 is known to those skilled in the art.

While the invention has been described as applied to a tire uniformity inspection machine it is to be understood that the invention is not limited to use in such equipment. To the contrary, the invention may be applied to great advantage in other applications wherein it is necessary to chuck a tire. It is to be further understood that the invention is not limited to the exact form shown and described above which are illustrative of a preferred embodiment of the invention. In view of the present disclosure those having skill in this art will be able to imagine various changes and modifications which can be made without departing from the spirit and scope of the invention as particularly pointed out and distinctly claimed in the appended claims.

The invention claimed is:

1. In a tire testing machine having a rotatable upper rim, a rotatable lower rim located below said upper rim and means for positioning a tire between said rims, apparatus for positioning the lower rim with respect to the upper rim to the required bead width, comprising:
   means for raising said lower rim until the space between said upper and lower rims is less than the required bead width,
   means for inflating a tire between said rims while said lower rim is in the raised position to set the beads on the rims,
   means for lowering said lower rim to the required bead width while said tire is inflated,
   a conical recess in the center of said upper rim,
   a nose cone slidably mounted to the center of said lower rim and engageable with said recess to align said rims, and,
   a gas spring received by said cone for biasing said cone into tight engagement with said recess to enable torque from said upper rim to be transmitted to said lower rim.

2. In a tire testing machine having a frame, a rim, means for rotating said rim, a rotatable other rim located adjacent said one rim, and means for positioning a tire between said rims, apparatus for positioning the one rim with respect to the other rim to the required bead width comprising:
   a) a spindle housing,
   b) a spindle rotatably mounted in said housing, one of said rims being mounted on said spindle,
   c) an actuator acting between said frame and said spindle housing for moving said housing toward and away from the other rim,
   d) a centering member axially slidably mounted in the center of said housing and engageable with center structure of the other rim when said housing is moved towards said other rim; and
   e) a gas spring urging said centering member toward said other rim.

3. The apparatus of claim 2 wherein said centering member comprises a nose cone and said center structure comprises a recess.

4. The apparatus of claim 3 wherein said centering member includes a shank having a recess for receiving said gas spring.

5. The apparatus of claim 4 wherein said shank defines anti-rotation structure for inhibiting rotation of said shank with respect to said housing.

6. The apparatus of claim 5 wherein said anti-rotation structure comprises at least one longitudinal slot formed on said shank and slidably engaged by a key held by said housing.

7. The apparatus of claim 6 wherein said longitudinal slot includes a through portion through which said key is installed to said housing.

8. The apparatus of claim 4 wherein said gas spring is installed in said shank such that a cylinder end of said gas spring is located adjacent said nose cone.

9. The apparatus of claim 4 wherein said gas spring is removably installed in said shank.

10. An adjustable width chuck for holding tires of different bead widths, said chuck comprising:
    a) a first half rim and an opposed second half rim, each of said half rims being adapted to retain a bead of a tire;
    b) an actuator connected to at least one of said half rims for selectively closing the chuck to a tire-holding position by moving said half rims together and opening the chuck to a tire-releasing position by moving said half rims apart;
    c) pilot means connected to said second half rim and being telescopically-extendable in the direction of said first rim over a range of distances; and
    d) a gas spring operably disposed between said pilot means and said actuator so that upon closing of the chuck, said pilot means engages said first half rim and resists the closing force applied by said actuator with a lesser force sufficient to insure centering of said half rims.

11. The adjustable width chuck of claim 10 wherein said pilot means comprises a nose cone forming part of a reciprocally movable shank in which said gas spring is installed.

12. An adjustable width chuck for holding tires of different bead widths, said chuck comprising:
    a) a first half rim and an opposed second half rim, each of said half rims having a circumferential lip adapted to retain the bead of a tire;
    b) an actuator connected to at least one of said half rims for selectively closing the chuck to a tire-holding position by moving said half rims together and opening the chuck to a tire-releasing position by moving said rim halves apart;
    c) telescoping pilot member connected to at least one of said half rims and disposed at least partially between said first half rim and said second half rim,
    d) a gas pressure generated biasing means operably disposed between said pilot member and said actuator means to cause said pilot member to tend to separate said half rims when the chuck is in said tire-holding position.

13. The adjustable width chuck of claim 12 wherein said gas pressure generated biasing means comprises a gas spring mounted within said telescoping pilot member.

14. The adjustable width chuck of claim 12 wherein said pilot member comprises a gas spring biased nose cone and said gas spring is mounted within a recess defined by a shank forming part of said nose cone.

15. The adjustable width chuck of claim 14 wherein said shank defines at least said one longitudinal slot engageable by an anti-rotation element performing part of the one-half rim whereby relative rotation between said shank and said one-half rim is inhibited, said slot including a through opening through which said anti-rotation element is installed.

* * * * *